(12) United States Patent
Granson et al.

(10) Patent No.: US 11,243,114 B2
(45) Date of Patent: Feb. 8, 2022

(54) METHOD FOR DETERMINING AT LEAST ONE BEAM PROPAGATION PARAMETER OF A LASER BEAM

(71) Applicant: TRUMPF Lasersystems for Semiconductor Manufacturing GmbH, Ditzingen (DE)

(72) Inventors: Viktor Granson, San Diego, CA (US); Jonathan Mueller, Stuttgart (DE); Dirk Sodtke, Tuebingen (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 107 days.

(21) Appl. No.: 16/132,965

(22) Filed: Sep. 17, 2018

(65) Prior Publication Data
US 2020/0088570 A1    Mar. 19, 2020

(51) Int. Cl.
*G01J 1/42* (2006.01)
*G02B 7/16* (2021.01)
(Continued)

(52) U.S. Cl.
CPC .......... *G01J 1/4257* (2013.01); *B23K 26/064* (2015.10); *B23K 26/402* (2013.01); *G01J 1/4228* (2013.01); *G01M 11/061* (2013.01); *G02B 7/16* (2013.01)

(58) Field of Classification Search
CPC .............................. G01J 1/4257; B23K 26/05
See application file for complete search history.

(56) References Cited

U.S. PATENT DOCUMENTS

2010/0253937 A1*  10/2010  Zerl .......................... G01J 1/04
                                                            356/122
2012/0086936 A1    4/2012  Hall
2017/0062247 A1    3/2017  Vianen et al.

FOREIGN PATENT DOCUMENTS

DE       19655127       9/2001    ............ B23K 26/04
DE      102015014387    5/2017    ................ G01J 1/00
WO    WO-2017080540 A1 * 5/2017   ............ G01J 1/4257

OTHER PUBLICATIONS

James S. Aber, Irene Marzolff, Johannes B. Ries, Chapter 6—Cameras for Small-Format Aerial Photogrammetry, Editor(s): James S. Aber, Irene Marzolff, Johannes B. Ries, Small-Format Aerial Photography.*

* cited by examiner

*Primary Examiner* — Rebecca C Bryant
(74) *Attorney, Agent, or Firm* — Fish & Richardson P.C.

(57) ABSTRACT

The invention relates to a method for determining at least one beam propagation parameter ($M^2$, $w_0$, $\theta$, $z_0$) of a laser beam, comprising: directing the laser beam through a lens arrangement towards a spatially resolving detector, imaging the laser beam at a plurality of different focus positions (F1, . . . ) relative to the spatially resolving detector by adjusting a focal length ($f_1$, . . . ) of the lens arrangement, and determining the at least one beam propagation parameter ($M^2$, $w_0$, $\theta$, $z_0$) by evaluating an intensity distribution (I(x,y)) of the laser beam on the spatially resolving detector at the plurality of different focus positions (F1, . . . ). The method comprises adjusting the focal length ($f_1$, . . . ) of the lens arrangement by arranging lens elements (A1, . . . ; B1, . . . ) having different focal lengths ($f_{A1}$, . . . ; $f_{B1}$, . . . ) in a beam path of the laser beam.

13 Claims, 1 Drawing Sheet

Figure 1A:
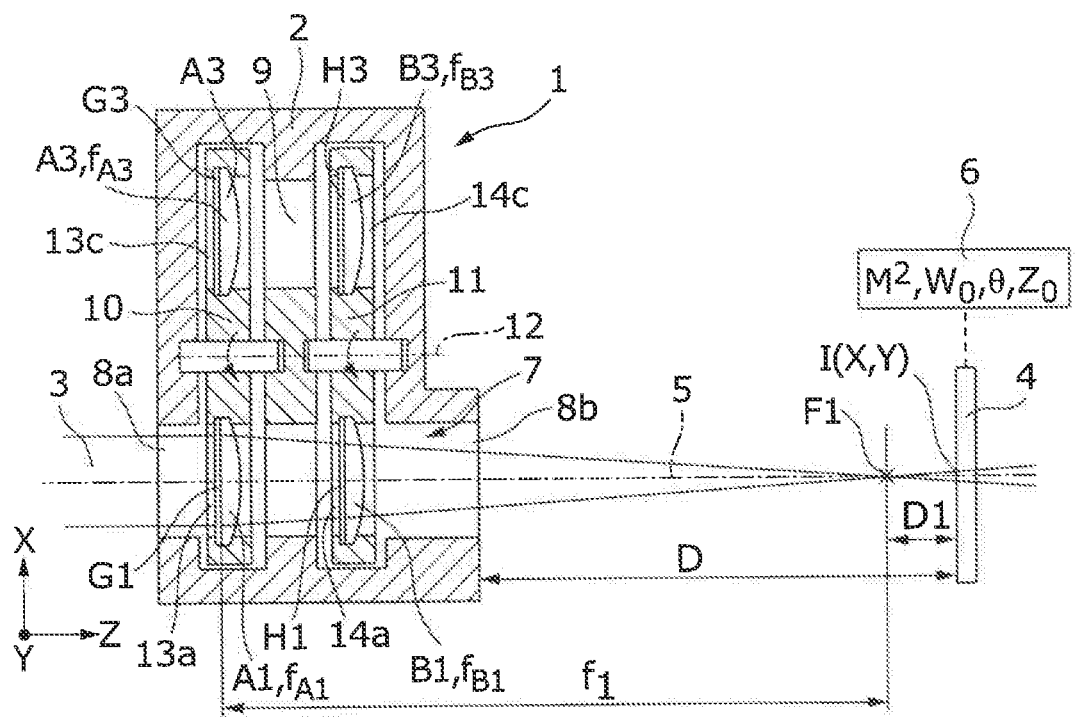

(51) Int. Cl.
*B23K 26/064* (2014.01)
*B23K 26/402* (2014.01)
*G01M 11/06* (2006.01)

METHOD FOR DETERMINING AT LEAST ONE BEAM PROPAGATION PARAMETER OF A LASER BEAM

The invention relates to a method for determining at least one beam propagation parameter of a laser beam, comprising: directing the laser beam through a lens arrangement towards a spatially resolving detector, imaging the laser beam at a plurality of different focus positions relative to the spatially resolving detector by adjusting a focal length of the lens arrangement, and determining the at least one beam propagation parameter by evaluating an intensity distribution of the laser beam on the spatially resolving detector at the plurality of different focus positions.

Determining beam propagation parameters of a (collimated) laser beam. e.g. a beam propagation ratio ($M^2$) may be performed based on a method described in the ISO 11146 measurement standard. According to the method, a lens of a known focal length is held stationary and a sensor is moved through the waist of the beam to take a series of measurements along a plurality of different positions (e.g. ten or more positions) along the beam propagation axis of the laser beam, determining a beam diameter for each position to obtain a beam caustic of the laser beam and then performing a curve fit to the measured data to calculate the $M^2$ parameter from that curve fit.

As the distance between the lens and the sensor has to be varied, performing the ISO measurement method with a measurement tool e.g. in a cleanroom is technologically involved. For instance, the measurement tool needs to have a radiation-tight housing while the distance between the lens and the sensor has to be varied, requiring either an automated moving or complex mechanics to move the detector inside the housing. For this reason, it may be necessary to fold the beam path in order to keep the measurement tool compact. Moreover, the fixation of the measurement tool to e.g. a processing device or the like where the measurement tool is used needs to be mechanically stable, etc.

DE 10 2015 014 387 B3 discloses a device for beam analysis of light beams that comprises a variable optical element, an objective lens, and a spatially resolving detector. The variable optical element has an adjustable focal length and the objective lens has a constant focal length. By changing the adjustable focal length of the variable optical element and by subsequent focusing of the light beam through the objective lens, a focus position of the focused light beam relative to the spatially resolving detector in an axial direction can be adjusted. In this way, a distance between the objective lens and the spatially resolving detector may be kept constant during the measurement. The variable optical element may be a fluid lens, an adaptive lens or an adaptive mirror. For instance, for $CO_2$/mid IR lasers one may use variable radius mirrors as adaptive mirrors, where the radius of curvature is changed via water pressure. However, using such mirrors greatly increases device complexity, cost and maintenance.

OBJECT OF THE INVENTION

The present invention seeks to provide an improved method for determining at least one beam propagation parameter of a laser beam.

SUBJECT MATTER OF THE INVENTION

This object is achieved by a method of the type set forth at the outset, wherein adjusting the focal length of the lens arrangement comprises arranging lens elements having different focal lengths in the beam path of the laser beam.

Rather than using a variable optical element for adjusting the focal length as described in DE 10 2015 014 387 B3, the present invention proposes adjusting the focal length of the lens arrangement by arranging lens elements having different focal lengths in the beam path of the laser beam. In this way, the lens arrangement only allows adjusting a predefined number of (different) focal lengths. Thus, the focal length of the lens arrangement and consequently each focal position of the laser beam relative to the spatially resolving detector is well-defined. A further advantage of using a set of lenses with discrete focal length is the robustness in industrial applications e.g. due to abstinence of active control elements such as pressure regulators of a variable focal length apparatus.

In contrast thereto, when using a variable optical element such as a fluid lens, the focal length can be varied continuously, so that it may be difficult to precisely define the focus position when adjusting the focal length. Moreover, the variation range of the focal length that can be adjusted by using a variable optical element is typically rather small and technical realizations of such adjustable optical elements may not exist for certain wavelength or intensity regimes, e.g. in the IR wavelength range. Finally, in contrast to the ISO measurement method, in the method described above, the distance (optical path) between the lens arrangement and the spatially resolving detector is kept constant.

In one variant, the lens arrangement comprises at least one carrier, the carrier comprising a plurality of accommodation spaces, each for accommodating at least one lens element and/or at least one attenuation element, wherein the step of arranging the lens elements having different focal lengths in the beam path of the laser beam comprises moving at least one earner having a plurality of accommodation spaces accommodating at least one lens element relative to the beam path of the laser beam. The movement of the carrier relative to the beam path of the laser beam typically involves moving a first accommodation space out of the beam path and moving another accommodation space into the beam path of the laser beam. In general, each accommodation space may be configured to accommodate more than one lens element, the lens elements typically being stacked in the direction of an optical axis of the laser beam in this case. Preferably, each accommodation space accommodates exactly one lens element.

In particular when the lens arrangement comprises more than one carrier, one of the accommodation spaces may not accommodate a lens element, so that the laser beam may pass through that accommodation space without being focused or defocused by a lens element. Typically, the lens elements of the lens arrangement are focusing lenses. However, as the case may be, at least one of the lens elements may be a diverging lens.

In addition to lens elements, the lens arrangement may comprise power attenuation elements to homogenize the signal/intensity levels of the laser beam being imaged at different focus positions, leading to different spot sizes of the intensity distribution on the spatially resolving detector. As the spot size and hence the intensity level on the spatially resolving detector depends on the focal length of a respective lens element, the attenuation elements in general have different attenuation levels. At least one attenuation element may be arranged together with a respective lens element in one and the same attenuation space of the carrier. In this case, the attenuation levels of the attenuation elements are adapted to the focal length of the corresponding lens elements so that the intensity level on the detector is homogenized, thus reducing the dynamic range requirement of the spatially resolving detector. The attenuation elements may be transmissive optical elements e.g. in the form of plane-parallel plates made of a material having a pre-defined absorption level. Alternatively, the attenuation elements may be devised as coatings on the lens elements made e.g. of an absorptive coating material, as beam splitters, etc. In either case, the same absorptive material may be chosen for all attenuation elements, different attenuation levels being achieved by selecting attenuation elements having different thicknesses.

In one variant, the lens arrangement comprises at least two carriers arranged one behind the other along the beam path of the laser beam, and wherein the step of arranging the lens elements having different focal lengths in the beam path of the laser beam comprises moving the at least two carriers independently from one another. By using more than one carrier, the number of combinations of lens elements arranged in the beam path and thus of different focal lengths that may be adjusted by using the lens arrangement may be considerably increased. For instance, when two carriers are used and each carrier has four accommodation spaces, the total number of optical configurations, resp., of different focal positions is 4×4=16. Those skilled in the art will appreciate that the overall (effective) focal length of the lens arrangement depends on the focal lengths of the individual lens elements arranged in the beam path of the laser beam and on the distance between these lens elements, resp., between the carriers according to the laws of geometrical optics. The focal lengths of the lens elements of the lens arrangement may be selected in such a way that a well-distributed spacing of imaging planes, resp., of overall focal lengths is generated when the focal length of the lens arrangement is adjusted.

In particular for the case that the lens arrangement comprises two carriers, each having accommodation spaces accommodating lens elements, a third carrier having accommodation spaces that accommodate only attenuation elements may be provided. In this way, the combinations of lens elements and attenuation elements that are arranged in the beam path may be chosen independently, thus reducing the number of attenuation elements needed for the homogenization of the intensity level at the spatially resolving detector.

In a preferred variant, the at least one carrier is designed as a rotatable magazine and the step of arranging the lens elements having different focal lengths in the beam path of the laser beam comprises rotating the rotatable magazine. Using a carrier in the form of a rotatable magazine, e.g. in the form of a disc-shaped magazine (turret wheel) having a plurality of accommodation spaces arranged at an equal distance from a center axis (revolution axis) of the magazine allows to provide a compact lens arrangement. The accommodation spaces are typically arranged at an equal spacing in the circumferential direction. For instance, when the rotatable magazine has four accommodation spaces, these are typically arranged at an angle of 90° relative to one another in the circumferential direction. The lens arrangement may comprise an actuator for rotating the disc-shaped magazine around the revolution axis to arrange one of the accommodation spaces in the beam path of the laser beam. Alternatively, the disc-shaped magazine may be rotated manually from the exterior of the housing, e.g. by providing a recess or the like in the housing so that a cylindrical outer edge of the disc-shaped magazine is accessible for an operator in order to rotate the magazine. In this way, the need for a motorized wheel is eliminated, thus improving robustness of the lens arrangement to failures.

An evaluation unit that is in signal communication with the detector may activate the actuator at pre-defined times to change the position of the accommodation spaces, thus allowing to relate an intensity distribution detected on the spatially resolving detector to a corresponding focus position.

One skilled in the art will appreciate that the carrier comprising the plurality of accommodation spaces is not necessarily designed as a disc-shaped magazine, but may be designed e.g. in the form of a (linear) slide for moving different accommodation spaces/lens elements into the beam path by translating the slide, typically in a direction perpendicular to a propagation axis of the laser beam. In this respect, reference is made to DE 196 55 127 C2, describing a connecting head for processing a workpiece with a laser beam, the connecting head comprising an automated changing mechanism for changing focusing optics, the changing mechanism having at least one movable carrier with a plurality of accommodation spaces.

US 2017/0062247 A1 describes an optical station for exchanging optical elements having a rotatable magazine with a plurality of accommodation spaces for accommodating a plurality of holders for holding respective optical elements. One skilled in the art will appreciate that the accommodation spaces of the carrier(s) of the lens arrangement described herein may likewise comprise holders for holding the optical elements, and that the lens elements may be removed from the accommodation spaces together with the holders e.g. in the way described in US 2017/0062247 A1.

In one development, the lens arrangement comprises at least two carriers designed as rotatable magazines, and the step of arranging the lens elements having the different focal lengths in the beam path of the laser beam comprises rotating the at least two magazines independently from one another. As indicated above, the rotatable magazines are arranged along the propagation axis of the laser beam one after the other. By independently rotating the two disc-shaped magazines, the number of focal lengths that may be adjusted can be increased considerably without having to significantly increase the installation space of the lens arrangement.

In another variant, at least one rotatable magazine comprises at least four accommodation spaces and all accommodation spaces of the rotatable magazine are subsequently arranged in the beam path of the laser beam for adjusting the focal length of the lens arrangement. As indicated above, it is advantageous to arrange all available lens elements/accommodation spaces in the beam path of the laser beam in order to increase the number of different focal positions that can be adjusted with the lens arrangement.

In another variant, the lens arrangement comprises a housing for sealing an interior space in a light-tight manner, and wherein the step of directing the laser beam through the lens arrangement comprises directing the laser beam through a first opening into the interior space of the housing and through a second opening out of the interior space of the housing. Preferably, the first opening and the second opening are aligned along a line of sight parallel to the propagation axis of the laser beam. In this way, the laser beam can pass through the lens arrangement without a lateral displacement, reducing the installation space of the lens arrangement. Optionally, windows in the form of plane-parallel plates that are aligned perpendicular to the propagation axis of the laser beam may be arranged in the openings. In any case, the lens arrangement/tool having the light-tight housing should enclose the laser beam entirely to be classified as a laser safety class 1 device, making the tool safe under all conditions of normal use.

The lens arrangement comprising the light-tight housing can be used as mobile measurement tool in a cleanroom or the like, e.g. for determining at least one beam propagation parameter of a laser beam that is used e.g. in a laser amplifier arrangement or in an EUV radiation generating device comprising such a laser amplifier arrangement. In a EUV radiation generating device, a laser beam is guided from the laser amplifier arrangement via a beam guiding device to a vacuum chamber. By irradiating a target material arranged in the vacuum chamber, e.g. in the form of tin droplets, a plasma can be generated, the plasma emitting EUV radiation. It will be appreciated that the use of the (mobile) measurement tool is not limited to determining beam propagation parameters of laser beams of driver laser arrangements for EUV radiation generation, but also in other installations, e.g. in processing machines for laser processing of workpieces or the like.

In a further variant, the beam propagation parameter of the laser beam is selected from the group consisting of: beam propagation ratio, beam waist (i.e. minimum beam radius), axial beam waist position (i.e. axial position along the beam bath with minimum beam radius), far-field divergence angle, or other representations of these or other beam propagation parameters or quantities derived therefrom, e.g. combinations of the beam parameters described herein or of other beam propagation parameters. For instance, instead of the axial beam waist position $z_0$, the beam radius (or diameter) at another axial position together with the information if the laser beam is diverging or converging at that axial position constitutes a derived quantity that is equivalent to the axial beam waist position, i.e. that provides the same information about the beam propagation of the laser beam. In a similar way, the beam propagation ratio and the far-field divergence angle are equivalent parameters for a given wavelength of the laser beam.

The beam propagation ratio $M^2$—often referred to as beam quality factor—represents the degree of variation of a beam from an ideal Gaussian beam. The beam propagation ratio $M^2$ is defined as the ratio of the far-field divergence angle of the laser beam with a given beam waist in relation to the far-field divergence angle of an ideal Gaussian beam with the same beam waist. However, as will be described below, it is not necessary to determine the divergence angle close to the actual beam waist directly in order to determine the beam propagation ratio $M^2$.

For determining beam propagation parameters) of the laser beam, typically the intensity distribution of the laser beam on the spatially resolving detector is evaluated to determine a beam diameter of the laser beam for each of the optical configurations of the lens arrangement, corresponding to different focus/imaging positions. In this way, a "virtual" beam caustic is generated, i.e. a series of images of the laser beam corresponding to different known image planes with different known magnifications, from which the beam diameter for the corresponding object planes can be calculated by applying the laws of geometrical optics. The "virtual" beam caustic formed by these calculated beam diameters at the object planes may be evaluated in an analogous way as a beam caustic measured in accordance with the ISO measurement standard, e.g. by performing a curve fit to the measured data/beam diameters to calculate the beam propagation ratio $M^2$ and/or other parameters such as the beam waist (minimum beam radius), the far-field divergence angle of the laser beam, the axial beam waist position, etc.

Further advantages of the invention emerge from the description and the drawings. Likewise, the features mentioned above and the features yet to be explained below may find use, either respectively on their own or in any combination when a plurality thereof are grouped together. The shown and described embodiments should not be understood to be a comprehensive list but, instead, should be seen to have an exemplary character for explaining the invention.

In the figures:

FIG. 1a,b show schematic illustrations of a lens arrangement having an adjustable focus length for focusing a laser beam at a first focus position and at a second focus position relative to a spatially resolving detector.

In the following description of the drawings, identical reference signs are used for identical or functionally identical components.

FIG. 1a,b show a portable measurement tool in the form of a lens arrangement 1. The lens arrangement 1 has a light-tight housing 2 through which a collimated laser beam 3 is directed towards a spatially resolving detector 4. e.g. a CCD-Camera, a CMOS chip or another pixel-based light-sensitive detector. The laser beam 3 has a beam axis 5 that is directed along a z direction of a xyz coordinate system. The lens arrangement 1 is configured to focus the laser beam 3 at different focus positions F1, F2, . . . along the beam axis 5 and thus at different distances D1, D2, . . . relative to the spatially resolving detector 4. For this purpose, the lens arrangement 1 is configured for adjusting its focal length $f_1$, $f_2$, . . . in a way that will be described in greater detail below.

As can be gathered from FIG. 1a,b, the lens arrangement 1 is arranged at a constant distance D from the detector 4. The distance D is chosen so that the lens arrangement 1 focuses the laser beam 3 at a first focus position F1 upstream of the detector 4 and at a second focus position F2 downstream of the detector 4 along the beam axis 5 of the laser beam 3. It will be appreciated that the two focus positions F1, F2 are shown for illustrative purposes only, and that the lens arrangement 1 is configured to focus the laser beam 3 at a plurality (typically ten or more) different focus positions F1, F2, . . . . At each focus position F1, F2 an intensity distribution I(x,y) perpendicular to the beam axis 5 of the laser beam 3 is detected at a light-sensitive surface of the detector 4. A programmable evaluation unit 6 that is in signal connection to the detector 4 evaluates the intensity distribution I(x, y) for each focus position F1, F2, . . . and determines a beam diameter of the intensity distribution I(x, y) that corresponds to a beam diameter of the laser beam 3 at the respective focus position F1, F2 Based on the (known) distances D1, D2, . . . between the focus positions F1, F2, . . . and the light-sensitive surface of the detector 4, a beam caustic of the laser beam 3, resp., beam propagation parameters of the laser beam 3 can be determined.

For instance, by performing a curve fit of the beam diameters determined by the evaluation unit 6 e.g. to a hyperbolic function, the $M^2$ parameter (beam propagation ratio) and other parameters such as the beam waist $w_0$ (minimal beam radius), a far-field divergence angle $\theta$ of the laser beam 3, an axial position $z_0$ of the beam waist, etc. can be determined in a similar way as in the ISO measurement method. It will be understood that a variety of other methods can be used to analyze or evaluate the measured beam diameters/intensity distributions I(x, y) at the different focus positions F1, F2 to determine beam propagation parameters $M^2$, $w_0$, $\theta$, $z_0$, . . . of the laser beam 3.

For adjusting the focal length $f_1$, $f_2$, . . . of the lens arrangement 1, lens elements A1 to A4, B1 to B4 having different focal lengths $f_{A1}$, . . . , $f_{A4}$; $f_{B1}$, . . . , $f_{B4}$ are arranged in a beam path 7 of the laser beam 3 passing through the lens arrangement 1. The laser beam 3 enters through a first opening 8a into an interior space 9 of the housing 2 of the lens arrangement 1 and the exits from the interior space 9 of the housing 2 through a second opening 8b towards the detector 4. In the example shown in FIG. 1a,b, the beam path 7 of the laser beam is confined to the area between the first and second openings 8a, 8b of the housing 2.

The lens arrangement 1 has a first rotatable disc-shaped magazine 10 and a second rotatable disc-shaped magazine 11, arranged one after the other along the propagation direction z of the laser beam 3. Each disc-shaped magazine 10, 11 may be rotated around a common revolution axis 12 arranged at the center of the respective magazine 10, 11 via an actuator e.g. in the form of a rotation motor or manually by an operator. In the latter case, a handling equipment may be provided that allows an operator to rotate a respective magazine 10, 11 from the outside of the housing 2. For instance, a recess/opening may be provided in the housing 2, allowing to access the circumferential edge of a respective disc-shaped magazine 10, 11 for the rotation. In this case, care must be taken to ensure that the housing 2 is still light-tight. In either case, the disc-shaped magazines 10, 11 can be rotated independently from each other either manually or by using two independent actuators.

Figure 1B:
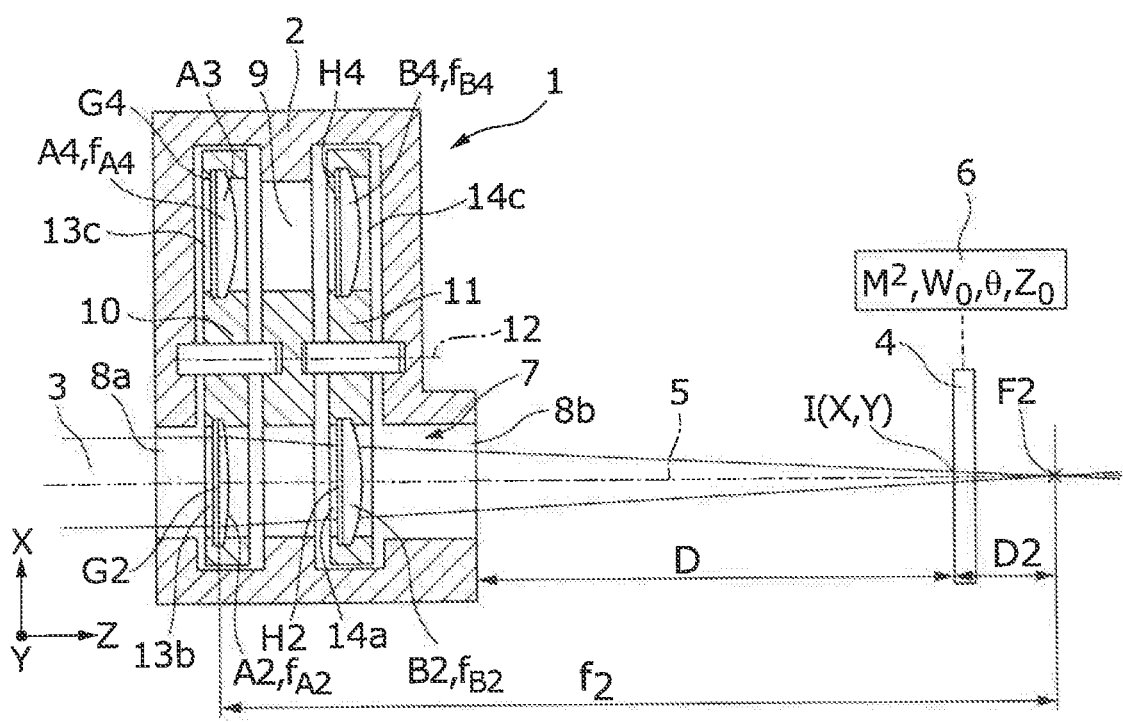

The first disc-shaped magazine 10 in the propagation direction z of the laser beam 3 has four accommodation spaces 13a-d, two of which are shown in FIG. 1a and two of which are shown in FIG. 1b. Each accommodation space 13a-d of the first disc-shaped magazine 10 holds one lens element A1 to A4. In addition, each accommodation space 13a-d of the first disc-shaped magazine 10 holds one attenuation element G1 to G4 for attenuating/reducing the power of the laser beam 3. The attenuation elements G1 to G4 are plane-parallel plates that have a different attenuation level depending on the focal length $f_{A1}$ to $f_{A4}$ of the corresponding lens element A1 to A4.

In an analogous way, the second disc-shaped magazine 11 in the propagation direction z of the laser beam 3 has four accommodation spaces 14a-d, each holding one lens element B1 to B4. In addition, each of the accommodation spaces 14a-d also holds one attenuation element H1 to H4. Each of the attenuation elements H1 to H4 generates a different level of attenuation of the power of the laser beam 3, the attenuation level being dependent on the focal length $f_{B1}$ to $f_{B4}$ of the corresponding lens element B1 to B4. The accommodation spaces 13a-d, 14a-d are aligned at angles of 90° relative to one another in the xy plane perpendicular to the propagation direction z of the laser beam 3.

In FIG. 1a, a first accommodation space 13a and thus a first lens element A1 of the first magazine 10 is arranged in the beam path 7 of the laser beam 3. In a similar manner, a first accommodation space 14a and thus a first lens element B1 of the second magazine 11 is arranged in the beam path 7 of the laser beam 3. The overall focal length $f_1$ of the lens arrangement 1 of FIG. 1a depends on the focal length $f_{A1}$ of the first lens element A1 of the first magazine 10, on the focal length $f_{B1}$ of the first lens element B1 of the second magazine 11 and on the (constant) distance between the two lens elements A1, B1 along the propagation axis 5 of the laser beam 3 in accordance with the laws of geometrical optics (not reproduced here).

For adjusting/changing the focal length of the lens arrangement 1, the evaluation unit 6 or an operator acts on both rotatable magazines 10, 11 to rotate these by an angle of 90°, as indicated by the arrows in FIG. 1a. After the rotation, the second accommodation space 13b and thus the second lens element A2 of the first magazine 10 is arranged in the beam path 7 of the laser beam 3. Similarly, the second accommodation space 13b and thus the second lens element B2 of the second magazine 11 is arranged in the beam path 7 of the laser beam 3 after the rotation. Consequently, the lens arrangement 1 shown in FIG. 1b has an overall focal length $f_2$ that depends on the focal length $f_{A2}$ of the second lens element A2 of the first magazine 10 and on the focal length $f_{B2}$ of the second lens element B2 of the second magazine 11. It will be appreciated that by rotating the first and/or the second magazine 10, 11, sixteen different focal lengths $f_1$, $f_2$, . . . may be adjusted with the lens arrangement 1 of FIG. 1a,b. Such a number of different focal lengths $f_1$, $f_2$, . . . is typically sufficient to determine the beam propagation parameters $M^2$, . . . of the laser beam 3 with sufficient accuracy.

The attenuation level of a respective attenuation element G1 to G4, H1 to H4 is chosen so that the intensity levels of the intensity profile I(x, y) on the spatially resolving detector 4 are homogenized. Thus, when the focal length $f_{A1}$ to $f_{A4}$, $f_{B1}$ to $f_{B4}$ of a respective lens element A1 to A4. B1 to B4 generates an intensity profile I(x,y) on the spatially resolving detector 4 that has a small spot size and thus a large intensity level, the attenuation of the corresponding attenuation element G1 to G4, H1 to H4 will be high compared to the case when the intensity profile I(x, y) has a larger spot size.

As an alternative to the embodiment shown in FIG. 1a,b, instead of attenuation elements G1 to G4, H1 to H4 that are arranged in one and the same accommodation space 13a-d, 14a-d together with a corresponding lens element A1 to A4, B1 to B4, a third rotatable magazine may be arranged in the housing 2 of the lens arrangement 1. The third rotatable magazine may also comprise four accommodation spaces, each holding an attenuation element, but no lens element. The third rotatable magazine may be rotated independently from the first and second rotatable magazine 10, 11, so that different combinations of lens elements A1 to A4, B1 to B4 and attenuation elements can be arranged together in the beam path 7 of the laser beam.

In summary, the lens arrangement 1 described above constitutes a compact portable measurement tool that may be used e.g. In a cleanroom to determine beam propagation parameters of a laser beam 3 with high accuracy. Moreover, as the case may be, the need to provide mechanical actuators in the lens arrangement 1 for acting on the rotatable magazines 10, 11 may be dispensed with.

The invention claimed is:

1. A method for determining at least one beam propagation parameter of a laser beam, the method comprising:
   directing the laser beam through a lens arrangement towards a spatially resolving detector,
   imaging the laser beam at a plurality of different focus positions relative to the spatially resolving detector by adjusting a focal length of the lens arrangement, and
   determining the at least one beam propagation parameter by evaluating an intensity distribution of the laser beam on the spatially resolving detector at the plurality of different focus positions, characterized in that adjusting the focal length of the lens arrangement comprises arranging lens elements having different focal lengths from at least one position out of a beam path of the laser beam to at least one position in the beam path of the laser beam, wherein the lens elements are chosen from a set of lenses having discrete focal lengths, wherein the lens arrangement comprises at least one carrier comprising at least one accommodation space that houses both an attenuation element and a lens element in a partially enclosed region within the carrier; and wherein the attenuation element in the at least one carrier is a transmissive optical element made of a material having a pre-defined absorption level.

2. The method according to claim 1, wherein the at least one carrier comprises a plurality of accommodation spaces, each for accommodating at least one lens element and/or at least one attenuation element, wherein arranging the lens elements having different focal lengths in the beam path of the laser beam comprises moving at least one carrier having a plurality of accommodation spaces accommodating at least one lens element relative to the beam path.

3. The method according to claim 2, wherein the lens arrangement comprises at least two carriers arranged one behind the other along the beam path of the laser beam, and wherein arranging the lens elements having different focal lengths in the beam path of the laser beam comprises moving the at least two carriers independently from one another.

4. The method according to claim 2, wherein the at least one carrier is designed as a rotatable magazine, and wherein arranging the lens elements having different focal lengths in the beam path of the laser beam comprises rotating the rotatable magazine.

5. The method according to claim 4, wherein the lens arrangement comprises at least two carriers designed as rotatable magazines, and wherein arranging the lens elements having different focal lengths in the beam path of the laser beam comprises rotating the at least two magazines independently from one another.

6. The method according to claim 4, wherein at least one rotatable magazine comprises at least four accommodation spaces, and wherein all accommodation spaces of the rotatable magazine are arranged subsequently in the beam path of the laser beam for adjusting the focal length of the lens arrangement.

7. The method according to claim 1, wherein the lens arrangement comprises a housing for sealing an interior space in a light-tight manner, and wherein directing the laser beam along the beam path through the lens arrangement comprises directing the laser beam through a first opening into the interior space of the housing and through a second opening out of the interior space of the housing.

8. The method according to claim 1, wherein the beam propagation parameter of the laser beam is selected from the group consisting of: beam propagation ratio, beam waist, far-field divergence angle, and axial beam waist position.

9. The method according to claim 1, wherein the at least one carrier comprises at least two accommodation spaces, each accommodation space defining a respective partially enclosed region of the at least one carrier that includes both a respective attenuation element and a respective lens element in a respective partially enclosed region, and wherein the respective attenuation elements have different attenuations levels.

10. The method according to claim 9, wherein the attenuation level of each respective attenuation element is adapted to the focal length of the respective lens element in the accommodation space with the respective attenuation element so that the intensity distribution of the laser beam on the spatially resolving detector is homogenized between the respective lens elements.

11. A method for determining at least one beam propagation parameter of a laser beam, the method comprising:

directing the laser beam through a lens arrangement towards a spatially resolving detector, imaging the laser beam at a plurality of different focus positions relative to the spatially resolving detector by adjusting a focal length of the lens arrangement, and determining the at least one beam propagation parameter by evaluating an intensity distribution of the laser beam on the spatially resolving detector at the plurality of different focus positions, characterized in that adjusting the focal length of the lens arrangement comprises arranging lens elements having different focal lengths from at least one position out of a beam path of the laser beam to at least one position in the beam path of the laser beam, wherein the lens elements are chosen from a set of lenses having discrete focal lengths, wherein the lens arrangement comprises:

a first carrier comprising at least one accommodation space that defines a first partially enclosed region within the first carrier, wherein the first partially enclosed region includes a lens element; and a second carrier comprising at least one accommodation space that defines a second partially enclosed region within the second carrier, wherein the second partially enclosed region includes one or more attenuation elements and does not include any lens elements; and wherein the attenuation elements are transmissive optical elements made of a material having a pre-defined absorption level.

12. The method according to claim 11, wherein the attenuation elements are plane-parallel plates.

13. The method according to claim 1, wherein the attenuation element is a plane-parallel plate.

* * * * *